(12) United States Patent
Nair et al.

(10) Patent No.: US 6,621,502 B1
(45) Date of Patent: Sep. 16, 2003

(54) METHOD AND SYSTEM FOR DECOUPLED AUDIO AND VIDEO PRESENTATION

(75) Inventors: Sukumaran V. S. Nair, Richardson, TX (US); George A. Deprez, Dallas, TX (US)

(73) Assignee: AWA, Inc., Dallas, TX (US)

( * ) Notice: Subject to any disclaimer, the term of this patent is extended or adjusted under 35 U.S.C. 154(b) by 196 days.

(21) Appl. No.: 09/847,237

(22) Filed: May 2, 2001

(51) Int. Cl.[7] .............................. G09G 5/00; G06F 15/16
(52) U.S. Cl. ...................... 345/716; 345/723; 709/206
(58) Field of Search .......................... 709/206; 345/716, 345/723; 725/143; 386/46; 348/739

(56) References Cited

U.S. PATENT DOCUMENTS

| | | | | |
|---|---|---|---|---|
| 4,017,676 A | * | 4/1977 | Rabeler et al. ............. 348/736 |
| 5,694,163 A | * | 12/1997 | Harrison ..................... 725/110 |
| 5,793,413 A | * | 8/1998 | Hylton et al. ................. 725/81 |
| 5,835,671 A | * | 11/1998 | Kitamura et al. ............. 386/97 |
| 5,848,239 A | * | 12/1998 | Ando ........................ 709/203 |
| 5,923,853 A | * | 7/1999 | Danneels .................... 709/238 |
| 5,959,659 A | * | 9/1999 | Dokic ........................ 725/152 |
| 6,035,096 A | * | 3/2000 | Kusakabe ................... 386/104 |
| 6,246,720 B1 | * | 6/2001 | Kutner et al. ........... 375/240.25 |
| 6,342,904 B1 | * | 1/2002 | Vasudevan et al. ......... 345/723 |
| 6,505,237 B2 | * | 1/2003 | Beyda et al. ............... 709/206 |

* cited by examiner

Primary Examiner—Krisna Lim
(74) Attorney, Agent, or Firm—Baker Botts L.L.P.

(57) ABSTRACT

A method and system for decoupled video and audio data presentation involves determining available data that may be displayed or spoken to a user. An audio portion of the available data and a visual portion of the available data are determined. The audio portion is communicated in an auditory form on an auditory device to a user and a visual indication indicating the presence of the visual portion is communicated to the user. A selection of the visual portion is received in response to the visual indication and a visual device separate from the audio device is determined for displaying the visual portion. In one embodiment, audio data and video data are dynamically synchronized across multiple devices.

30 Claims, 7 Drawing Sheets

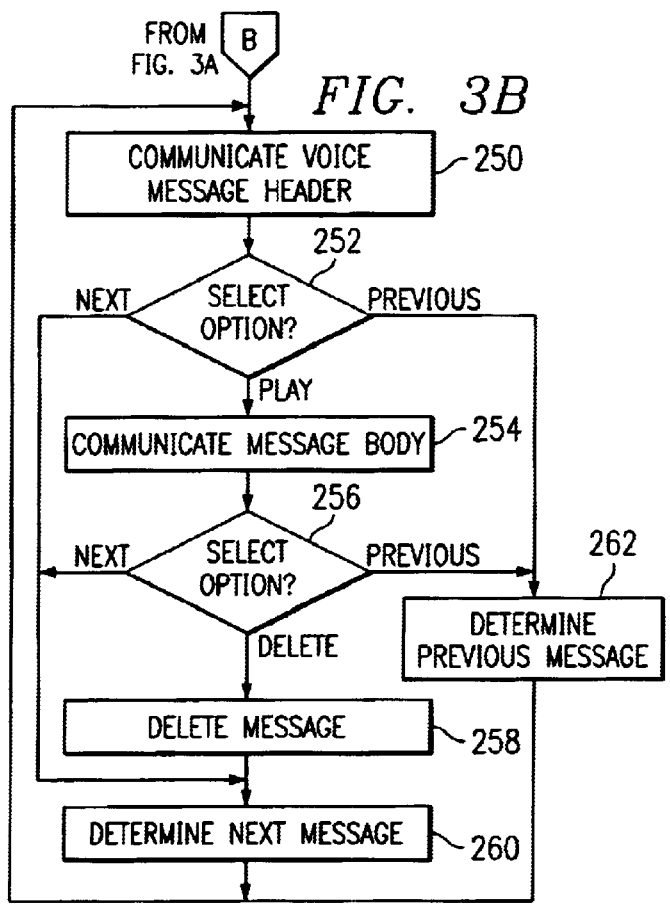
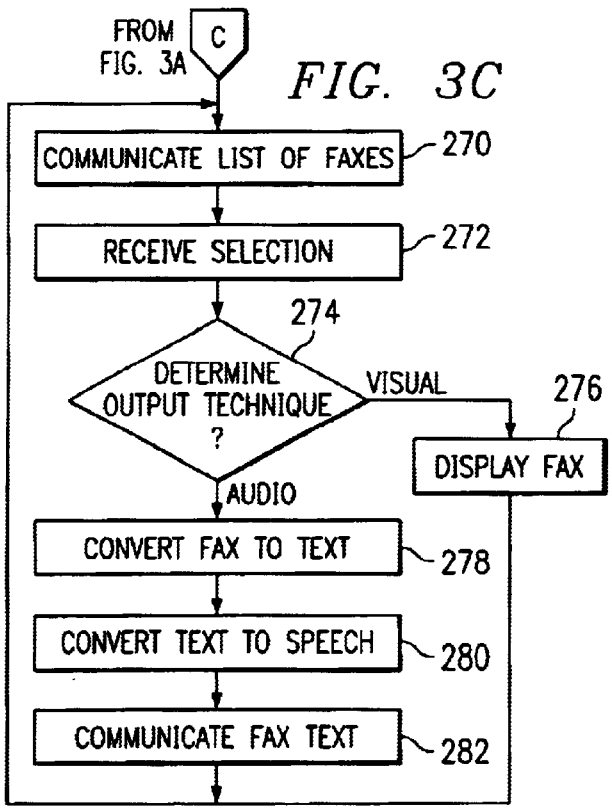
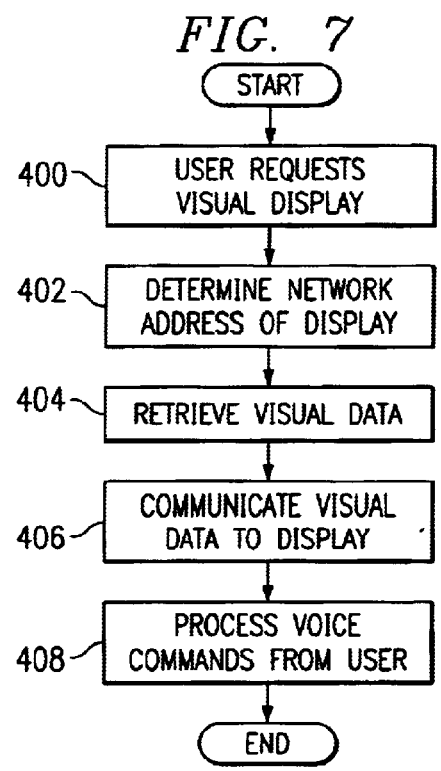

METHOD AND SYSTEM FOR DECOUPLED AUDIO AND VIDEO PRESENTATION

TECHNICAL FIELD OF THE INVENTION

This invention relates in general to data processing and, more specifically, to a method and system for decoupled audio and video presentation.

BACKGROUND OF THE INVENTION

As computers have grown increasingly important in today's society, the desire of users to access information from a variety of locations has also increased. The desire to access information from a variety of locations also lead to an increase in the use of wireless voice phones by users. For example, users may desire to access electronic mail from their cell phones. Typically, users cannot access all portions of their electronic mail from their cellular phones, such as attachments and graphics, due to the limitations of cellular phones.

SUMMARY OF THE INVENTION

The present invention provides a method and system for decoupled audio and video presentation. In a particular embodiment, display of video data on a device independent of an audio device is presented.

According to one embodiment of the present invention, a method and system for decoupled video and audio data presentation is presented. Available data is determined. An audio portion of the available data and a visual portion of the available data is determined. The audio portion is communicated in an auditory form on a auditory device to a user and a visual indication indicating the presence of the visual portion is communicated to the user. A selection of the visual portion is received in response to the visual indication and a visual device separate from the audio device is determined for displaying the visual portion.

The present invention provides numerous technical advantages. Various embodiments of the present invention may provide all, some or none of these technical advantages. One such technical advantage is the capability for receiving audio data on one device while displaying visual data on a separate device. A user may retrieve audio data from a server and be notified that visual data is associated with the audio data. The user may then display the visual data on a visual display, such as a monitor. The user may also lock a visual display so that a given item of visual data continues to be displayed on a given display while the user retrieves unrelated audio data.

BRIEF DESCRIPTION OF THE DRAWINGS

The present invention is best understood from the detailed description which follows, taken in conjunction with the accompanying drawings, in which:

FIGS. 3A, 3B, and 3C are a flow chart illustrating an exemplary method of operation for a unified messenger of the voice and data delivery system according to one embodiment of the present invention;

FIG. 7 is a flow chart-illustrating a method for combined audio and visual data output according to one embodiment of the present invention.

DETAILED DESCRIPTION OF THE INVENTION

Figure 1:
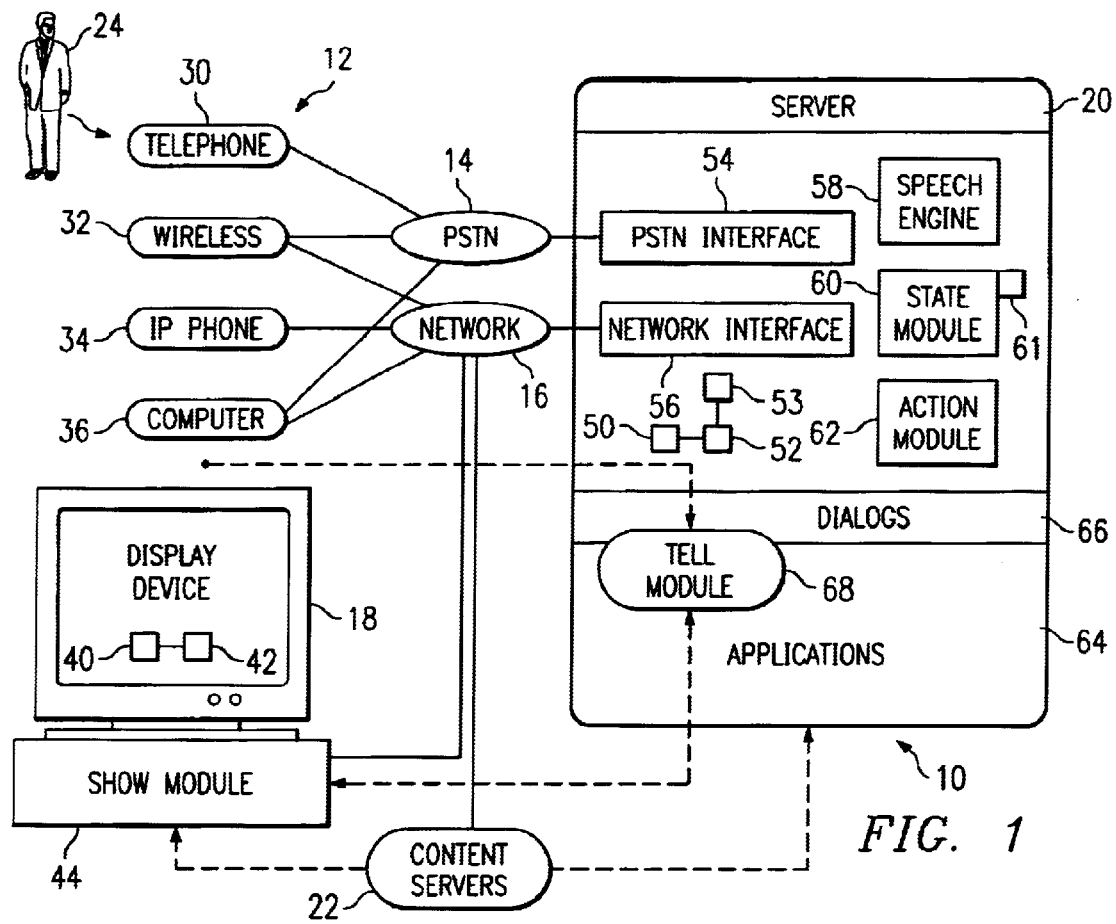
FIG. 1 is a block diagram illustrating a flexible voice and data delivery system according to one embodiment of the present invention.

FIG. 1 is a block diagram illustrating a flexible voice and data delivery system 10. System 10 comprises one or more clients 12, a public switched telephone network (PSTN) 14, a packet-switched network 16, visual display device 18, a server 20, and one or more content servers 22.

Clients 12 include a traditional voice telephone 30, a wireless telephone 32, such as a cell phone, a packet-based voice phone 34, such as a phone based on the voice-over Internet protocol (VoIP), and/or a general purpose computer 36. Telephone 30 comprises a typical circuit-switched voice telephone operable to communicate over PSTN 14. Wireless telephone 32 comprises a voice phone operable to communicate using a wireless protocol. For example, wireless phone 32 may comprise a cellular phone. In general, wireless phone 32 may use a suitable wireless communication technology such as code division multiple access (CDMA), time division multiple access (TDMA), global system for mobile (GSM) and/or the wireless access protocol (WAP). General purpose computer 36 comprises a suitable electronic device having a processor and memory, and which is operable to communicate over packet switched network 16. Packet switched phone 34 comprises a voice phone operable to use packet switched network 16. In general, client 12 comprises an audio based input/output device.

PSTN 14 comprises a suitable circuit-switched network operable to communicate with clients 12. PSTN 14 supports voice and/or analog data communications. Packet-switched network 16 comprises a suitable data transmission network operable to communicate with clients 12. In one embodiment, packet switched network 16 comprises the Internet. For example, network 16 may comprise an asynchronous transfer mode (ATM) network, an Internet protocol (IP) network and other suitable packet based data communications technology.

Display device 18 comprises a visual output device. For example, display device 18 may comprise a monitor, a television, a liquid crystal display (LCD) or other suitable visual output devices. Display device 18 further comprises a processor 40 and storage 42.

Processor 40 comprises a suitable general purpose or special purpose electronic processing device operable to communicate with storage 42. For example, processor 40 may comprise a central processing unit (CPU) such as a Pentium processor from the Intel Corporation of Santa Clara, Calif. Storage 42 comprises transient and/or persistent storage either alone or in suitable combination. Storage 42 comprises electronic storage, magnetic storage, and optical storage, either alone or in suitable combination, operable to be accessed by processor 40. For example, storage 42 may comprise electronic random access memory (RAM), CD-ROM storage, and/or magnetic hard disks. Storage 42 also operates store logic executable by processor 40. Logic comprises instructions, applications, applets, programs and other data usable by processor 40.

Display device 18 is further operable to use a show module 44 associated with display device 18. Show module 44 comprises software and/or hardware operable to communicate with other devices on network 16 and control display device 18. For example, show module 44 may be stored in storage 42 and supported by processor 40. Show module 44 receives data and commands from server 12 over network 16 and may retrieve data from content servers 22. Show portion 44 may then use the data and commands to control and/or configure display device 18.

Content servers 22 comprise sites remote from display device 18 and server 20, and are operable to communicate with network 16. Content servers 22 store content for retrieval by show module 44 and server 22 over network 16. For example, content servers 22 may comprise hypertext transport protocol (HTTP) servers commonly referred to as web servers. In general, content servers 22 are operable to receive requests for content, such as audio, video, textual and other data, and respond to the request by providing the requested content over network 16.

Server 20 comprises a processor 50, computer readable storage 52, a PSTN interface 54, a network interface 56, a speech engine 58, a state module 60, an action module 62, one or more applications 64 and one more dialogs 66.

Processor 50 comprises a suitable general purpose or special purpose electronic processing device operable to communicate with the storage 52. For example, processor 50 may comprise a central processing unit (CPU) such as a Pentium processor from Intel Corporation of Santa Clara, Calif. Processor 50 may comprise multiple processors. Storage 52 comprises transient and/or persistent storage in suitable combination. Storage 52 may comprise electronic storage, magnetic storage, and optical storage, operable either alone or in suitable combination, to be accessed by processor 50. For example, storage 52 may comprise electronic random access memory (RAM), CD-ROM storage, and/or magnetic hard disks. Storage 52 operates to store logic usable by processor 50.

PSTN interface 54 comprises hardware and/or software in suitable combination operable to transmit and receive information over PSTN 14. For example, PSTN interface 54 may comprise an analog modem or an interactive voice response (IVR) system.

Network interface 56 comprises hardware and/or software either alone or in suitable combination operable to communicate data over network 16. For example, network interface 56 may comprise an Ethernet interface, an asynchronous transfer mode (ATM) interface, an integrated services digital network (ISDN) or other suitable network interfaces. Network interface 56 may be further operable to support various network protocols such as voice-over Internet protocol (VOIP) and the Internet Protocol (IP).

Speech engine 58 comprises software and/or hardware either alone or in suitable combination operable to receive spoken audio and convert the spoken audio into a textual representation or a prespecified action item. In one embodiment, spoken audio waveforms are captured by hardware and/or software to be matched against a list of possible results. More specifically, the list may be a grammar. Grammars contain slot variables associated with each possible result. When one or more results are detected in a waveform, the corresponding slots are logically filled. Computer logic can then test these slots as conditions and initiate desired actions. Depending on the context of a given dialog, which may be associated with a particular service, a filled slot will result in the appropriate services being activated to perform the desired action. For example, consider a personal information management (PIM) system for managing contact information. A sub-dialog may be charged with handling input of information into a database. Another sub-dialog may be charged with searching the database for an entry and presenting it back to the user. The two actions, writing and reading can be accomplished by obtaining information through one or more auditory prompts. For another example, speech engine 58 may comprise a speech-to-text application programmer's interface (API) such as a recognition API and/or a text-to-speech API. For yet another example, the Nuance speech channel APIs and Nuance foundation speech objects APIs for speech recognition and the L&H Realspeak 2 API for text-to-speech conversion may be used. In general, suitable processing techniques may be used for processing spoken commands.

State module 60 comprises software and/or hardware either alone or in suitable combination operable to maintain and track a current state 61 associated with user 24. For example, state module 60 may use a state machine to determine an appropriate response to user 24 based on an expected input. Continuing the example, the state machine may have a "list email" state which is expecting the user to select a particular email to be read to the user. Current state 61 comprises an indication of previous input and options for handling current input.

Action module 62 comprises software and/or hardware, either alone or in suitable combination operable to perform actions based on input from user 24 and the current state tracked by state module 60. For example, action module 62 may invoke an application 64 in response to a particular input from user 24.

Applications 64 comprise one or more applications that may be provided to user 24 by server 20. Applications 64 are described in more detail in association with FIG. 2.

Dialogs 66 comprise prompts and other prerecorded information to be communicated to user 24. For example, a particular dialog 66 may comprise a menu for accessing applications 64.

In operation, user 24 uses a client 12 to communicate with server 20 over PSTN 14 or network 16. Server 20 provides access to one or more items of available data to user 24. Often, user 24 communicates with server 20 using spoken audio and receives audio data from server 20. Audio data comprises data that may be represented in an audio format, such as text or spoken audio. For example, user 24 may communicate with server 20 using voice telephone 30. The available data may include both an audio portion and a visual portion. The audio portion may be communicated in an auditory form to user 24. For example, audio portions may simply be spoken to user 24 over a telephone. The visual portion may be displayed on display device 18 indicated by user 24. For example, user 24 may retrieve an e-mail and have the text portion of the e-mail read to user 24 in an audio form. The e-mail may also have a graphical attachment, such as a diagram, which user 24 may display visually on display device 18.

More specifically, speech engine 58 receives the spoken audio from user 24 and converts it to a textual form or the prespecified action item for use by state module 60. State module 60 then determines current state 61 of user 24. More specifically, state module 60 tracks and maintains the current logical location of the user 24 with respect to the state machine associated with state module 60. For example, when user 24 first connects to server 20, the state machine may be in a start state and awaiting an initial command from user 24. Then, after state module 60 has updated current state 61 based on the input from user 24, action module 62 is called by state module 60 to invoke the one or more actions associated with the current state. Action module 62 may then use application 64 and/or dialog 66 to perform the requested actions.

User 24 may receive an indication from server 20 that visual data is available that cannot be properly represented with spoken audio. User 24 may receive multiple indications of available visual data. User 24 then selects the visual data to display visually. Visual data comprises graphics, text, animations, videos, and other data that may be difficult or inappropriate for representation in a spoken format. For example, while simple text may be represented in an audio format, specially formatted or graphical text may not be representable in an audio format. For another example, graphical data may be represented only in a visual manner, such as a graph or a picture. In addition, user 24 may choose to receive data that is representable in an audio format in a visual manner. In one embodiment, the audio-visual context is achieved by using an audio-video context mapping (AVCM). User 24 may then send a command to display the visual data on display device 18.

An audio context comprises a set of states respectively associated with one or more dialogs. For example, if an application has several services, then each service may be considered a separate context and have a respective associated audio context. In addition, each service may be further divided into one or more sub-contexts. Each audio context may then be mapped to a video context using the AVCM.

The video context comprises a set of states which respectively represents information in a visual manner. In one embodiment, the video context is defined using a video context template (VCT). The video context also defines associated dialogs, which provide methods for manipulating the video content, whether it is in text, image, video, or another format.

For example, consider a user who receives an audio dialog from a system. The user may traverse several audio dialogs using only spoken commands. The AVCM allows the user to engage a video display device to display visual information associated with the audio dialogs and/or the current state. The user may choose to set a video display mode to selective or continuous. If the display mode is set to selective and the user issues a "show" command, then the display device will show the information defined in the AVCM video context corresponding to the current audio context of the user. If the display mode is set to continuous, then one or more display devices show dynamically changing content as the user changes audio contexts. The AVCM is described in more detail in association with FIG. 8.

State module 60 then instructs action module 62 to retrieve the visual data and communicate the visual data over network 16 to display 18. More specifically, tell module 68 communicates the visual data over network 16 to show module 44. Show module 44 then receives the visual information and displays it on display device 18. Alternatively, tell module 68 may communicate information to show module 44 so that show module 44 can retrieve the visual data from content server 22. For example, tell module 68 may communicate a uniform resource locator (URL) associated with the hypertext transport protocol (HTTP) to show module 44. Show module 44 may then use the URL to retrieve the visual data from content server 22 for display on device 18.

While show module 44 is displaying the visual data on display device 18, user 24 may move to a different location where display device 18 is no longer visible. User 24 may then instruct server 20 to display the visual data on a new display device. Tell module 68 then instructs show module 44 associated with the original display device 18 to cease displaying the visual data and instructs show module 44 associated with the new display device to display the visual data.

More specifically, a database 53 on storage 52 stores information about users 24 that call into system 10 and about display devices 18 registered by users 10. The registration process for display device 18 stores a identifier of the particular display device 18, such as a name, a identifier associated with user 24 that may use the particular display device 18, and sharing/security information associated with the particular display device 18.

User 24 may access information using system 10 which involves visual data. In one embodiment, user 24 places tell module 68 in the selective display mode. In the selective display mode, user 24 may issue a spoken command of "show data on display device identifier". For example, user 24 may speak the command "show attachment on main display" to indicate to server 20 that user 24 wishes to view the attachment to a currently open e-mail on the display device 18 identified by user 24 during the registration process as "main display." Action module 62 then sends a command to show module 44 associated with the particular display device 18 indicating the data to be displayed. The indication may include the location of the data, such as a Uniform Resource Locator (URL) and/or may include the data to be displayed. When only the location of the data is sent, show module 44 retrieves the data from the location and then displays the information on the display device 18 associated with show module 44. When the data itself is sent, show module 44 displays the data on the display device 18 associated with show module 44. In addition, user 24 may give the command "show on display" and omit the information to display. If the information to display is not indicated by user 24, then visual information associated with current state 61 is displayed on display device 18 indicated by user 24. Also, the user may give the command "show data" and omit where to display the information. If display device 18 is omitted in the command, then the information will be displayed on a default display device 18 as indicated by user 24 during the registration process.

Further, user 24 may issue a display change request. For example, user 24 may be viewing visual data on a monitor in a conference room. User 24 may then return to user's office and issue the display change request to move the visual data from the conference room monitor to a display in the user's office. More specifically, user 24 issues the show command with different display devices 18 and switch display devices 18. User 24 may also use a transfer command to transfer display of visual information from one display device 18 to another display device 18. The transfer command may be seen as a simplified show command. For example, user 24 may say "transfer to device", to change from displaying the information on a first display device and display the same information on a second display device. User 24 could also have said "show information on device"

to transfer display from the first display device to the second display device.

Tell module 68 also supports a lock command which allows the user to lock a display device 18 such that the information displayed on the display device does not change when user 24 changes states and is receiving audio information not related to the displayed visual information. Stated another way, the lock command allows tell module 68 and show module 44 to be decoupled from current state 61 and display visual information independent of the current audio information. Also, other display devices 18 may be displaying visual information independently of the locked display device. For example, user 24 may lock a first display device to continue to display an attachment to a first e-mail while the user retrieves spoken data associated with a different e-mail.

Figure 2:
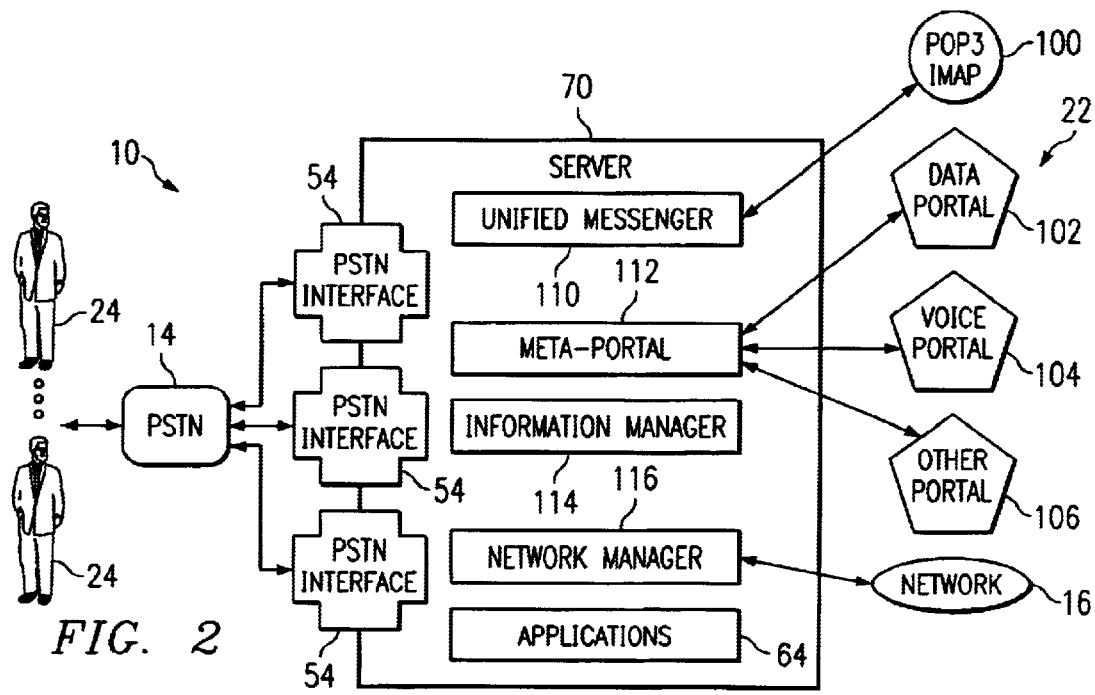
FIG. 2 is a block diagram illustrating further details of the voice and data delivery system according to one embodiment of the present invention.

FIG. 2 is a block diagram illustrating further details of system 10. Content servers 22 further comprise one or more mail servers 100, one or more data portals 102, one or more voice portals 104, and one or more other portals 106.

Mail server 100 comprises software and/or hardware either alone or in suitable combination operable to receive and communicate electronic mail to server 20. For example, electronic mail server 100 may comprise a server supporting the Post Office Protocol version 3 (POP3) or the Internet Message Access Protocol (IMAP).

Data portal 102 comprises software and/or hardware either alone or in suitable combination operable to communicate electronic data to server 20. For example, data portal 102 may comprise a web server using the HTTP protocol.

Voice portal 104 comprises software and/or hardware either alone or suitable combination operable to provide access to voice-based services. For example, voice portal 104 may provide access to news items stored in a spoken format. For another example, voice portal 104 may access other suppliers of voice based information, in contrast to visually based information, to communicate to users 24 by server 20.

Other portal 106 comprises other suitable wired and wireless portals.

Applications 64 comprise a unified messenger application 100, a meta-portal application 112, an information manager application 114 and a network manager module 116.

Unified messenger module 110 comprises software and/or hardware either alone or in suitable combination operable to provide access to electronic mail, voice mail and faxes in both visual and auditory format. More specifically, unified messenger module 110 comprises the capability to allow user 24 to access electronic mail, voice mail and faxes visually, such as by using computer 36. Unified messenger module 110 also comprises, the capability to allow user 24 to access electronic mail, voice mail and faxes auditorally. For example, user 24 may communicate over PSTN 14 to server 20 and have unified messaging module 110 communicate email from email server 100 using spoken audio. More specifically, unified messenger module 100 may read the text associated with an electronic mail to user 24 over PSTN 14 using spoken audio. Unified messenger module 110 is described in more detail in association with FIGS. 3 and 4.

Meta-portal module 112 comprises software and/or hardware either or alone or in suitable combination comparable to retrieve information data portal 102, voice portal 104 and other portals 106. More specifically, meta-portal 112 operates to receive data retrieval commands from user 24, retrieve the requested audio data from voice portal 104 and communicate the audio data to user 24. For example, user 24 may verbally request that a search be performed on content servers 22 on network 16 with audio content available. Meta-portal module 112 may then perform a search on voice portal 104. Information found on voice portal 104 may then be communicated over PSTN 14 to user 24 in the original audio format for the information. For example, meta-portal module 112 may retrieve audio data from voice portal 104 and communicate the information directly to the user. In general, meta portal module 112 may use suitable techniques for retrieving information from content servers 22 and communicating the retrieved information to user 24.

In one embodiment, meta-portal module 112 is further operable to retrieve data from data portal 102 and/or other portals 106 and provide the information to user 24 over PSTN 14. For example, meta-portal module 112 may perform a search on information available from data portal 102 and other portals 106. The information retrieved from data portal 102 may be visual in nature, such as text and graphics based web pages, that are converted into spoken audio by meta portal module 112 for communication to user 24 over PSTN 14.

Information manager 114 comprises software and/or hardware either alone or in suitable combinations operable to provide personal information management capabilities. More specifically, information manager 114 provides an address book, a calendar and a voice dialer. The calendar is described in more detail in association with FIG. 5. The address book is described in more detail in association with FIG. 6.

Network manager 116 comprises software and/or hardware either alone or in suitable combination operable to support communication of data and information over network 16. For example, network manager 116 is operable to provide fault notification and simple network management protocol (SNMP) support. More specifically, network manager 116 operates in association with network interface 56 for receiving and transmitting data over network 16. For example, network manager 116 may comprise a Transmission Control Protocol/Internet Protocol (TCP/IP) stack.

In operation, user 24 communicates with server 20 over PSTN 14. More specifically, user 24 communicates with server 20 using spoken audio as opposed to a visual communication system. User 24 may then choose to retrieve the user's email. Unified messenger 110 then retrieves the user's electronic mail from electronic mail server 100. Unified messenger module 110 next reformats the electronic mail for communication using spoken audio over PSTN 14 to user 24.

User 24 may also retrieve information from data portal 102, voice portal 106 and/or other portals 106 using meta portal 112. For example, user 24 may retrieve a web page using a uniform research locator 112 (URL) from data portal 102 and meta portal 112 would convert data portal 102 appropriately for spoken communication to user 24.

In general, system 10 supports the dynamic synchronization of the displayed audio and visual data. More specifically, as user 24 changes location, user 24 may change display device 18 being used. System 10 may update the visual data displayed on the chosen display device 18 based on current state 61.

Figure 3A:
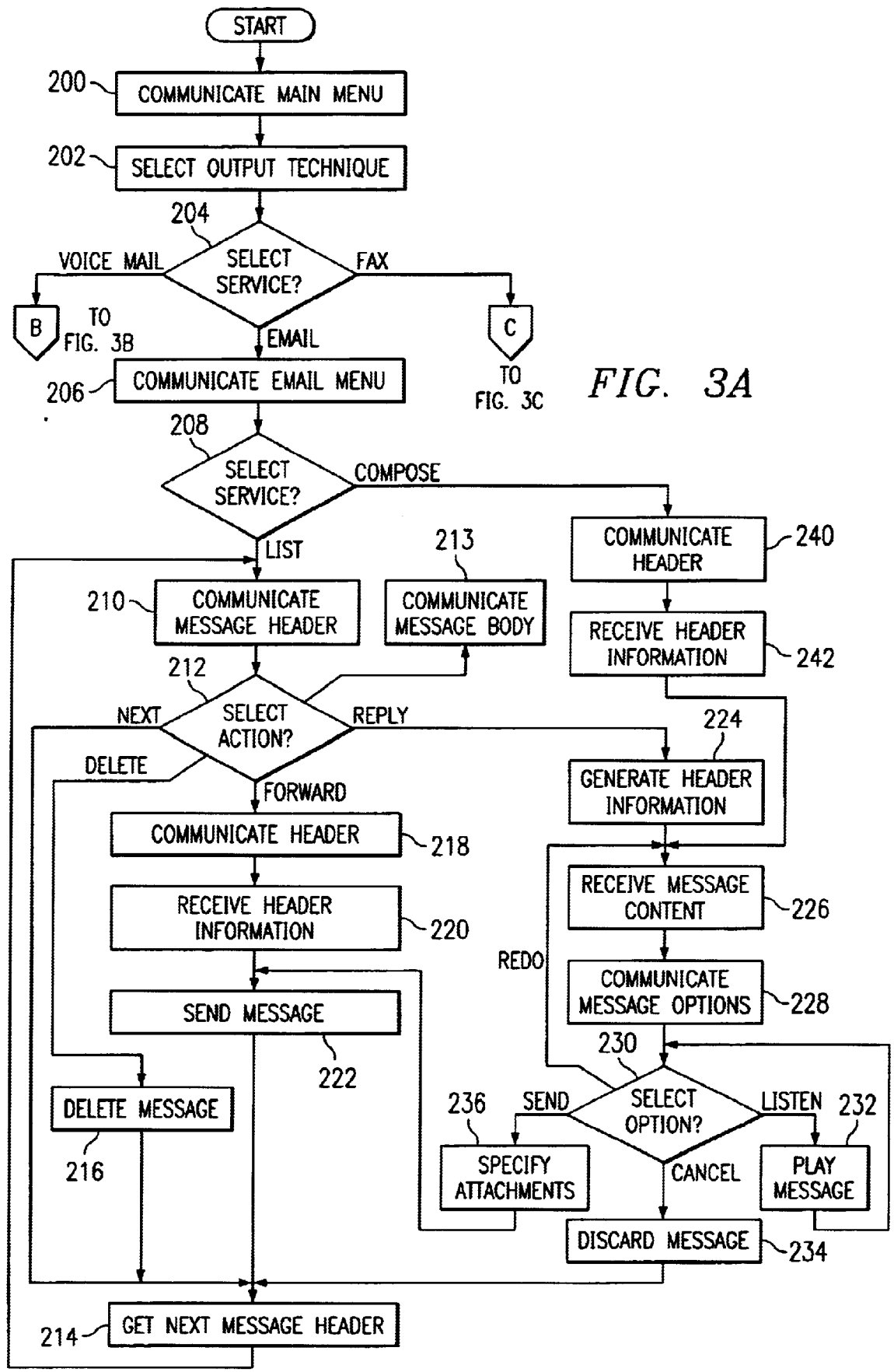

FIGS. 3A, 3B, and 3C are a flow chart illustrating an exemplary method of operation for unified messenger 110. The method begins at step 200, where a main menu is communicated to user 24 from server 20. For example, the main menu may comprise a list of commands that may be used by the user. Next, at step 202, user 24 selects an output technique. More specifically, user 24 selects whether server 20 will communicate with user 24 using only spoken audio or spoken audio plus visual output on display device 18. If user 24 selects to receive only spoken audio, then server 20 will communicate information in a spoken manner to clients 12. If user 24 selects both spoken and visual input and output, then server 20 may communicate visual data to display device 18 and spoken data to clients 12 as appropriate.

Proceeding to decisional step 204, user 24 selects a service from the main menu. User 24 may select an e-mail service, a voice mail service or a fax service. When user 24 selects the e-mail service the E-MAIL branch of decisional step 204 leads to step 206. At step 206, server 20 communicates an e-mail menu to user 24 using the appropriate combination of spoken and/or visual outputs as determined in step 202. Then, at decisional step 208, user 24 selects a service from the e-mail menu. In particular, user 24 may decide to list e-mails or compose a new e-mail. When user 24 selects to list e-mails the LIST branch of decisional step 208 leads to step 210.

At step 210, a header associated with an e-mail is communicated to user 24. More specifically, the sender of the message, the date of the message, and/or the subject of the message may be communicated to user 24. In general, suitable portions of the header of the e-mail may be communicated to user 24. User 24 may also configure which portions of the header of the e-mail that user 24 wishes to receive. For example, available header elements may comprise the date the e-mail is sent, the time the e-mail is sent, the sender of the e-mail, the recipient of the e-mail, the subject of the e-mail, and the priority of the e-mail. Next, at decisional step 212, user 24 selects an action to perform on the e-mail whose header was communicated to user 24 in step 210. If the user desires to listen to the next message header the NEXT branch of decisional step 212 leads to step 214. At step 214, unified messenger 110 determines the next message header and the method proceeds to 210 where the next message header is communicated to the user. If the user deletes the message then the DELETE branch of decisional 212 leads to step 216. At step 216, the message and associated header are deleted and the method proceeds to 214. If user 24 chooses to forward the e-mail associated with the header read in step 210, then the FORWARD branch of decisional step 212 leads to step 218. At step 218, one or more header fields are communicated to user 24. More specifically, header field such as the message and the recipient of the e-mail message, are communicated to user 24. Then, at step 220, unified messenger 110 receives the completed entered information from user 24. More specifically, user 24 has provided a recipient for the message and, optionally, a subject for the message. Proceeding to step 222, unified messenger 110 communicates the e-mail message to the designated recipient. For example, unified messenger 110 may communicate the e-mail message using the simple mail transport protocol (SMTP). The method then continues to step 214 where the next message header is determined.

Returning to decisional step 212, user 24 may also indicate that user 24 wishes to reply to the message communicated to the user in step 210. If the user wishes to reply to the message then the REPLY branch of decisional step 212 leads to step 224. At step 224, unified messenger 110 generates appropriate header information in order to communicate the reply to the appropriate recipients. More specifically, unified messenger 110 may determine the electronic mail address associated with the sender of the electronic mail being replied to and the subject of the electronic mail being replied to and use them as the recipient and subject of the reply. In addition, unified messenger 110 may determine the e-mail address and/or identity of the sender to be included as the sender of the reply. Proceeding to step 226, message content is received from user 24. For example, user 24 may be prompted to begin speaking the body of the e-mail and unified messenger 110 will record the body of the e-mail. In addition, user 24 may type the body of the e-mail. Proceeding to step 228, after the user 24 has provided the body of the message, unified messenger 110 communicates one or more message options associated with the message. More specifically, user 24 may have the option re-doing the message, listening to the message, canceling the message, and sending the message. Then, at decisional step 230, if user 24 selects the re-do option, then the RE-DO branch of decisional step 230 returns to step 226 where a new body for the message may be received from user 24. Alternatively, the re-do option may return user 24 to step 224 in order to re-enter the header information. If user 24 desires to listen to the message, then the LISTEN branch of decisional step 230 leads to step 232. At step 232, unified messenger 110 reads back the body and the header of the message to the user and the method returns to step 230 so that user 24 may select another option. If user 24 wishes to discard the message, then the CANCEL option of decisional step 230 leads to step 234. At step 234, unified messenger 110 discards the body and header of the message and the method returns to step 214 where the next message header is determined. If user 24 chooses to send the message then the SEND branch of decisional 230 leads to step 236. At step 236, user 24 specifies any attachments to be attached to the message and the method proceeds to step 222 where the message is sent.

Returning the decisional step 208, if user 24 desires to compose a new message, then the COMPOSE branch leads to step 240. At step 240, one or more header fields are communicated to user 24. More specifically, header field such as the message and the recipient of the e-mail message, are communicated to user 24. Then, at step 220, unified messenger 110 receives the completed entered information from user 24. More specifically, user 24 has provided a recipient for the message and, optionally, a subject for the message.

Then, at step 242, unified messenger 110 receives the completed entered information from user 24. More specifically, user 24 has provided a recipient for the message and, optionally, a subject for the message. The method then continues to step 226.

Returning the decisional step 204, if the user selects the voice mail option then the VOICE MAIL branch of decisional step 204 leads to step 250. At step 250, a voice mail header is communicated to user 24. More specifically, the sender of the voice mail, the date of the voice mail, the time of the voice mail, and other suitable information may be communicated to user 24. Proceeding to decisional step 252, user 24 may select from the options of playing the body of the message associated with the header, or moving on to the next or previous voice message header. If the user selects the option to play the body of the voice message then the PLAY branch of decisional step 252 leads to step 254. At step 254, unified messenger 110 communicates the message body to user 24 on an appropriate output device. More specifically, unified messenger 110 may visually display the text to the user on visual output 18 after performing a speech-to-text conversion, or may speak the voice mail message to user 24 over client 12. Next, at decisional step 256, user 24 may select the options of deleting the voice mail message, or moving to the next or previous voice mail message. If user 24 desires to delete the voice mail message then the DELETE branch of decisional step 256 leads to step 258 where the voice message presented in step 254 is deleted. The method then proceeds to step 260, where unified messenger 110 determines the next voice mail message to present to the user and the method returns to step 250. If user 24 desires to listen to the next voice mail message then the NEXT branch of decisional step 256 leads to step 260 where the next voice mail message is determined. If user 24 desires to listen to the previous voice mail message then the PREVIOUS branch of decisional step 256 leads to step 262. At step 262, unified messenger 110 determines the voice mail message previous to the voice mail message presented to the user in step 254. The method then returns to step 250 where the header for the previous voice mail message is communicated to user 24.

Returning to decisional step 252, if user 24 desires to listen to the next message header then the NEXT branch of decisional step 252 leads to step 260. If user 24 desires to listen to the previous message header then the PREVIOUS branch of decisional step 252 leads to step 262.

Returning to decisional step 204, if the user wishes to retrieve a fax then the FAX branch of decisional step 204 leads to step 270. At step 270, unified messenger 110 communicates a list of available faxes to user 24. Then, at step 272, user 24 selects one of the faxes available. For example, user 24 may speak a number associated with one of the faxes in the list. Then, at decisional step 274, unified messenger 110 determines the output technique selected by user 24 in step 202. If user 24 has specified that visual output may be used then the VISUAL branch of decisional step 274 leads to step 276. At step 276, unified messenger 110 displays the fax selected in step 272 on display device 18 specified by user 24. If user 24 has specified only auditory output, then the audio branch of decisional step 274 leads to step 278. At step 278, unified messenger converts the selected fax to a textual representation. More specifically, unified messenger 110 may use optical character recognition (OCR) to convert fax 278 from a faxed format to a textual format. Then, at step 280, unified messenger 110 may user server 12 to convert the text to speech and at step 282, unified messenger 110 communicates the fax text auditorally to user 24. The method then returns to step 270.

Figure 4:
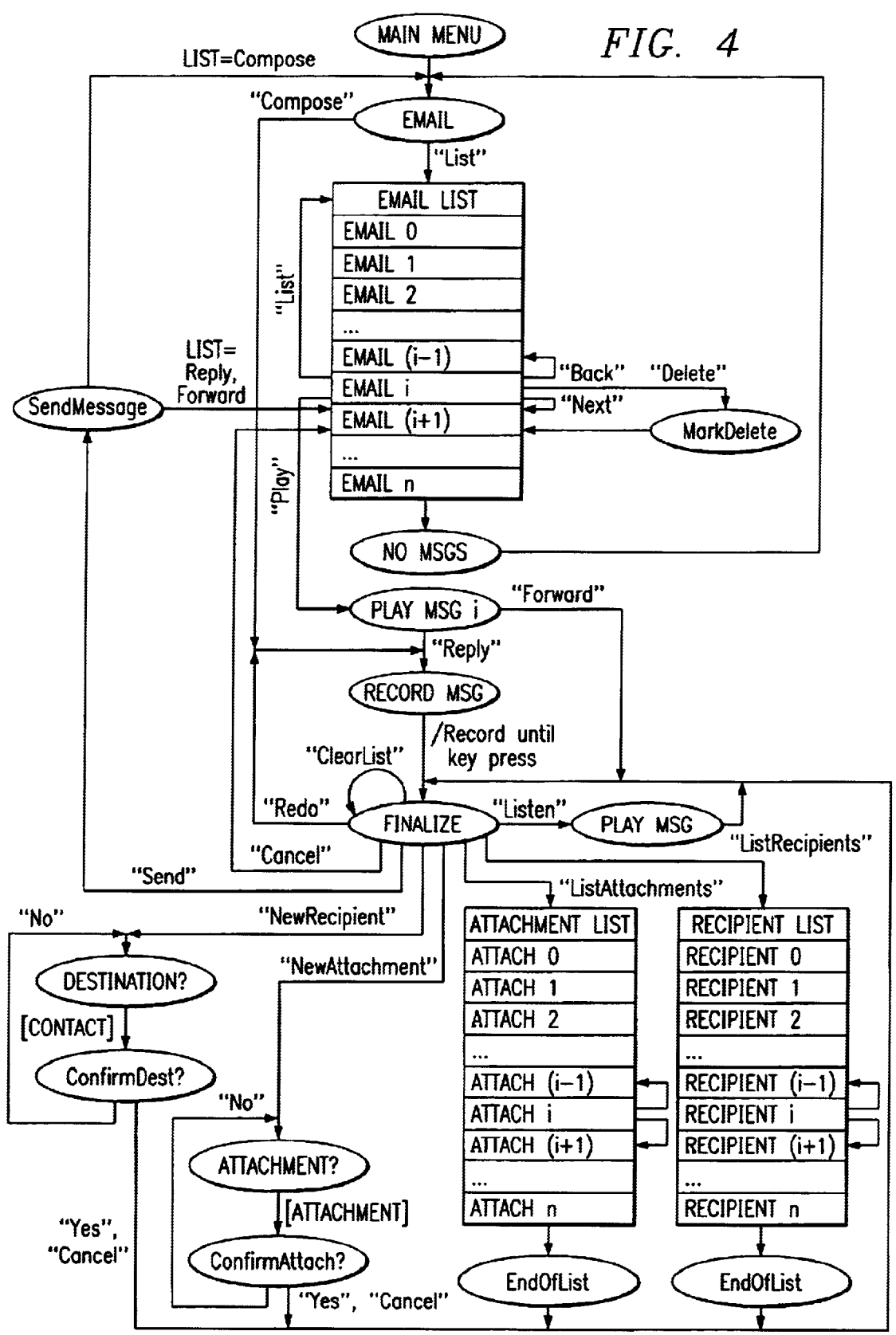
FIG. 4 is a flow chart illustrating further details of the operation of an e-mail service of the unified messenger according to one embodiment of the present invention.

FIG. 4 is a flow diagram illustrating further details of the operation of the e-mail service of unified messenger 110. The nodes contain short descriptions of activities to be performed while the edges indicate commands used to move from one node to another.

Figure 5:
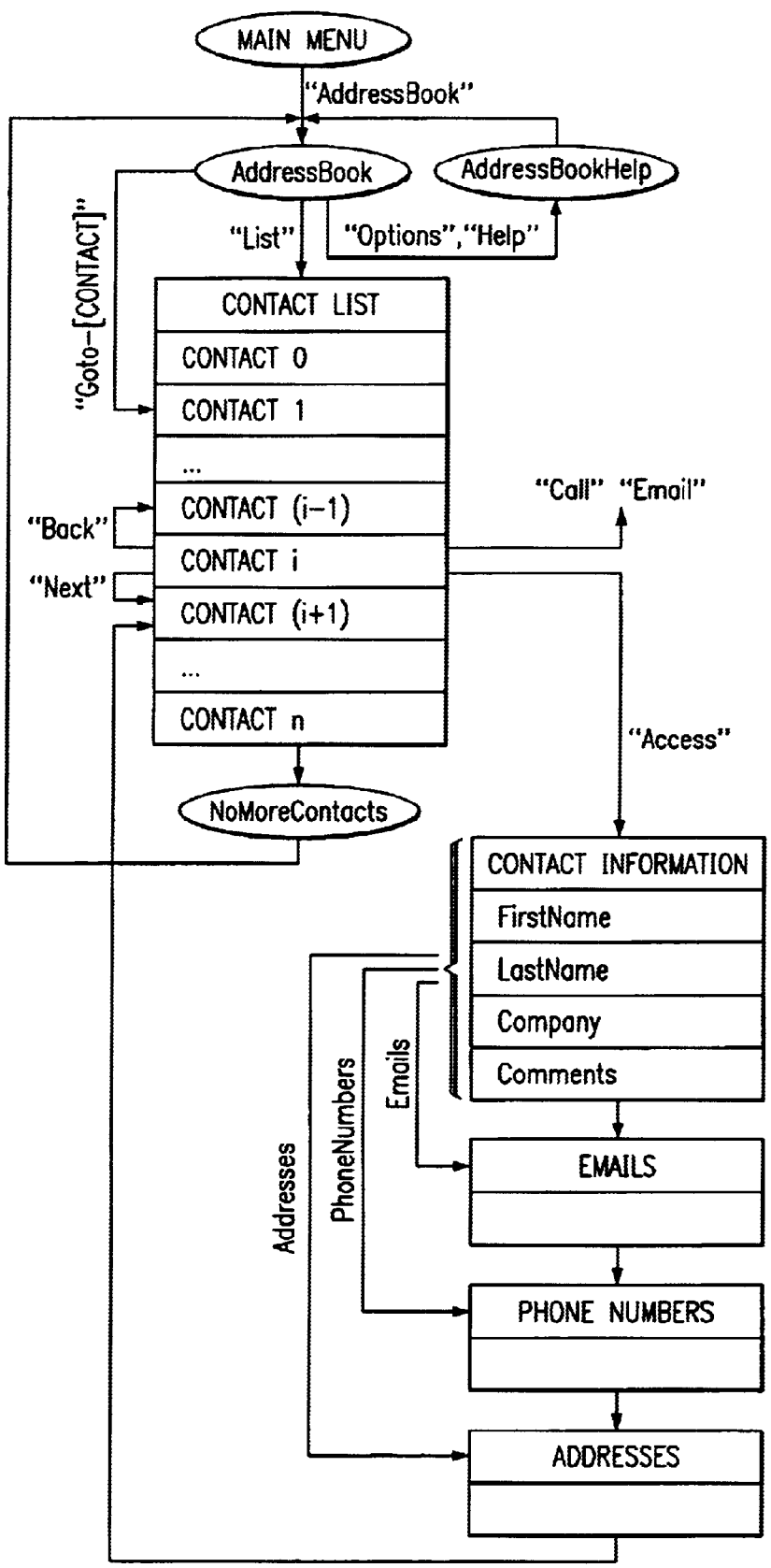
FIG. 5 is a flow chart illustrating details of operation of an address book portion of an information manager of the voice and data delivery system according to one embodiment of the present invention.

FIG. 5 is a flow diagram illustrating details of operation of the address book portion of information manager 114. Similar to FIG. 4, the nodes in the diagram represent actions and the labels of the edges indicate commands to move from action-to-action.

Figure 6:
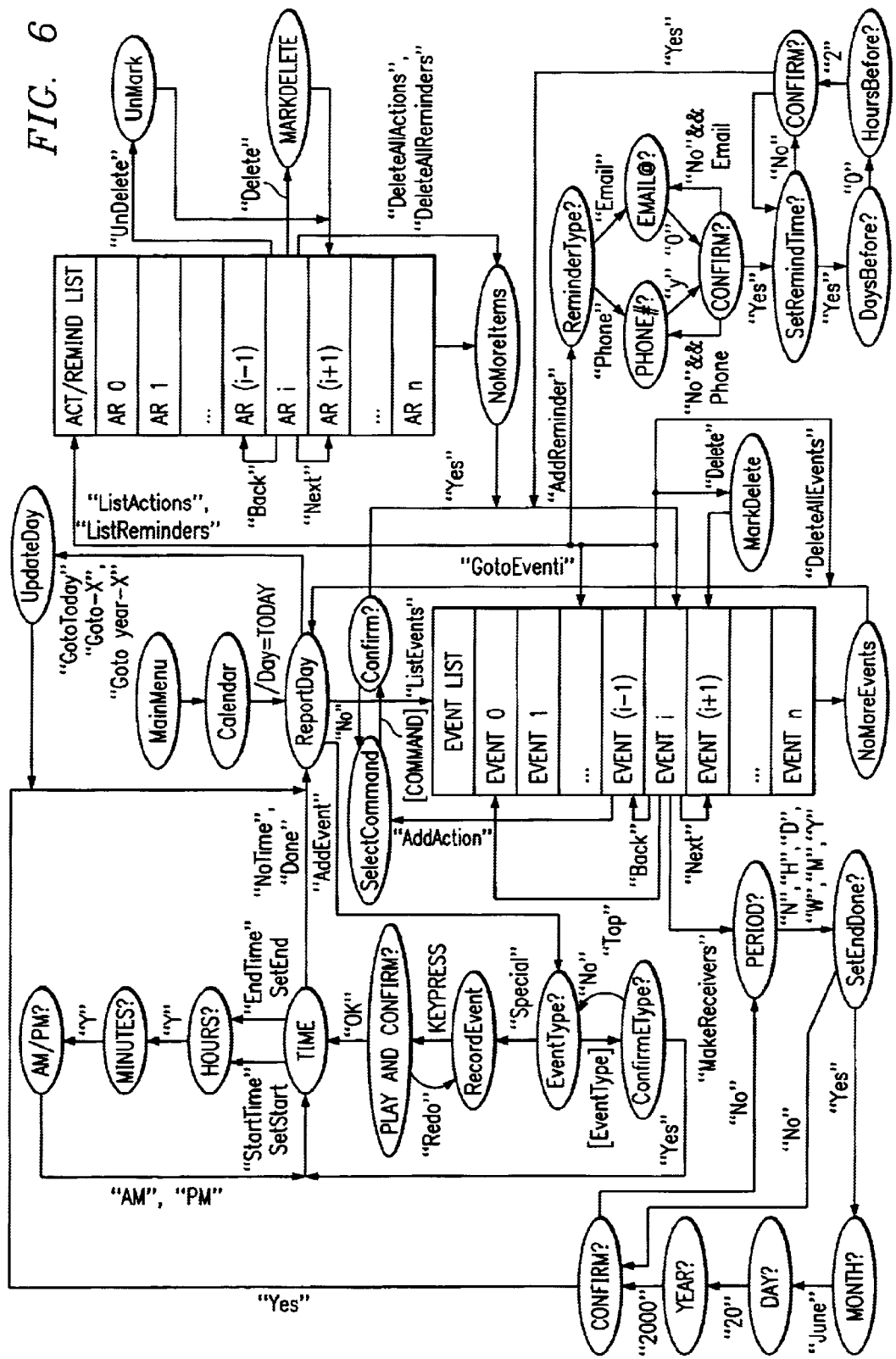
FIG. 6 is a flow chart illustrating details of a calendar portion of the information manager according to one embodiment of the present invention.

FIG. 6 is a flow diagram illustrating details of the calendar portion of information manager 114. The nodes of the flow diagram illustrate actions and the edges are annotated with commands to transit from one action to another.

FIG. 7 is a flow chart illustrating a method for combined audio and visual data output. The method begins at step 400, where user 24 requests visual display of a data item by server 20. Then, at step 402, server 20 determines the network address of output display 18. More specifically, user 24 may provide an IP or other network address identifying display device 18. Alternatively, user 24 may have previously configured server 20 with the address of preferred display devices 18 and user 24 may select one of these pre-configured display devices 18. Then, at step 404, server 20 retrieves the data to be displayed on display device 18. For example, server 20 may retrieve an attachment to an e-mail, a fax, or other data. Proceeding to step 406, tell module 68 communicates the visual data to show module 44 display device 18. Show module 44 then displays the visual data on display device 18. Next, at step 408, server 20 continues to process voice commands from user 24.

Figure 8:
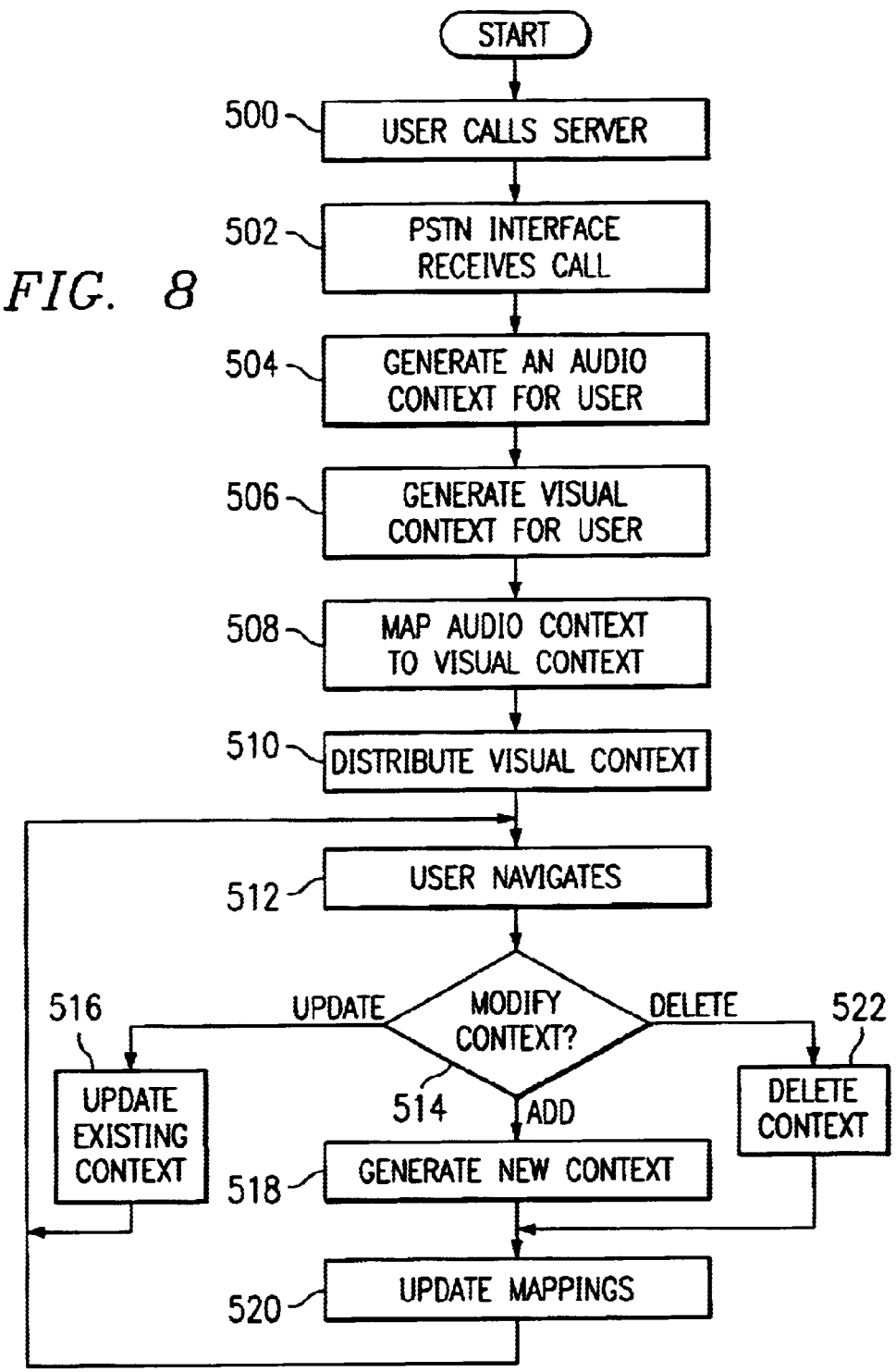
FIG. 8 is a flow chart illustrating audio-video context mapping according to one embodiment of the present invention.

FIG. 8 is a flow chart illustrating an exemplary embodiment of the AVCM. The method begins at step 500 where user 24 calls into server 20 over PSTN 14. Next, at step 502, server 20 receives the user's call over PSTN interface 54. Then, at step 504, action module 62 generates a new audio context for user 24 in response the user's call. Multiple audio contexts may be created. For example, an audio main menu context may be created for user 24 when user 24 initially connects to server 20. In one embodiment, the audio context is associated with a state in state module 60 and the audio context currently in use by user 24 is associated with current state 61. Proceeding to step 506, a new visual context is generated for user 24 by action module 62. Multiple visual contexts may be generated. For example, a visual context may be created for user 24 when user 24 initially connects to server 20 providing a visual map of available options.

Next, at step 508, the audio context is mapped to the visual context. More specifically, the audio and visual contexts are associated with each other so that as user 24 navigates through options provided by server 20, the audio and visual contexts can maintain proper associations. For example, user 24 may instruct tell module 68 to display a site map on a computer monitor while user 24 retrieves various auditory information. Action module 62 would associate a visual context associated with the site map with multiple audio contexts so that as user 24 browses audio information, the site map remains on the computer monitor. Continuing the example, various new visual contexts may be created for particular items of visual data user 24 may choose to display.

Then, at step 510, the visual context is distributed to appropriate display devices. More specifically, as multiple display devices may be associated with a single visual context, the data associated with the visual context is distributed to the various display devices. For example, a power point presentation may be displayed on multiple video projectors at multiple locations as a presentation is being given in conjunction with a conference call.

Proceeding to step 512, user 24 navigates options provided by server 20. Then, at decisional step 514, action module 62 determines whether to update, add or delete audio and/or visual contexts in response to input from user 24. For example, action module 62 may determine whether to update or add visual contexts based on whether the user has entered an new audio context and create a new visual context, or selected a hyperlink in the current visual context causing an update of the current visual context. If action module 62 updates an existing context then the UPDATE branch of decisional step 514 leads to step 516.

At step 516, an existing audio or visual context is updated. The update may include new information received from user 24 as user 24 has used server 20. For example, an audio car rental system may provide three audio contexts, a car rental company selection context and a car selection context. When the car company is selected from the company selection context, an associated visual context may be updated to display only the selected car. In the car selection context, which may also be associated with the same visual context as the company selection context, as the user selects details about the car, the visual context is updated to display the selected details about the car. By updating previously created contexts, action module 62 is capable of dynamically updating audio and visual contexts based on information not available when the context was initially created.

Returning to decisional step 514, if action module 62 determines that a new audio or visual context is needed, then the ADD branch of decisional step 514 leads to step 518. At step 518, a new audio or visual context is generated by action module 62. For example, user 24 may navigate from receiving e-mails to reading news on the World Wide Web (WWW) and a new audio context may be generated for the news. Next, at step 520, mappings between existing audio and visual contexts, and new audio and visual contexts are updated to account for changed context relationships.

Returning to decisional step 514, if a context is to be deleted, then the DELETE branch of decisional step 514 leads to step 522. At step 522 one or more contexts may be deleted and context mappings are updated to account for the deleted contexts at step 520.

Other changes, substitutions, and alterations are also possible without departing from the spirit and scope of the present invention, as defined by the following claims.

What is claimed is:

1. A method for decoupled video and audio data presentation comprising:
   determining available data, the available data comprising data available at a server, the available data further comprising audio data and visual data;
   determining an audio portion of the available data by reformatting at least a portion of the visual data to an audio form;
   determining a visual portion of the available data;
   communicating to one or more client devices the audio portion in an auditory form on an auditory device;
   communicating to the one or more client devices a visual indication indicating the presence of the visual portion;
   receiving at the server a selection of the visual portion in response to the visual indication; and
   determining a visual device according to a client request, the visual device separate from the audio device and operable to display the visual portion.

2. The method according to claim 1 and further comprising displaying the visual portion on the visual device.

3. The method according to claim 2 and further comprising:
   receiving a display change request from the one or more client devices; and
   determining a second visual device distinct from the audio and visual devices for displaying the visual portion in response to the display change request.

4. The method according to claim 3, wherein the second visual device comprises a video display.

5. The method according to claim 3, wherein a user generates the display change request in response to the user changing location.

6. The method according to claim 3, wherein the display change request is generated by a client device in response to a change in location of the client device.

7. The method according to claim 1, wherein the available data comprises an electronic mail message.

8. The method according to claim 7, wherein the audio portion comprises text associated with the electronic mail message.

9. The method according to claim 7, wherein the visual portion comprises a graphical attachment associated with the electronic mail message.

10. The method according to claim 1, wherein the audio device comprises a voice phone.

11. The method according to claim 1, wherein the visual device comprises a video display.

12. The method according to claim 1, wherein the visual indication comprises a spoken indication of data not presentable in an auditory format.

13. The method according to claim 1, wherein receiving the selection comprises receiving a spoken indication from a user to display the visual portion.

14. The method according to claim 13, wherein the spoken indication further indicates the visual device.

15. The method of claim 1, further comprising communicating asynchronously the audio portion and the video portion.

16. A system for decoupled video and audio data presentation comprising:
   logic stored on storage and operable to:
      determine available data, the available data comprising data available at a server, the available data further comprising audio data and visual data;
      determine an audio portion of the available data by reformatting at least a portion of the visual data to an audio format;
      determine a visual portion of the available data;
      communicate to one or more client devices the audio portion in an auditory form on an auditory device;
      communicate to the one or more client devices a visual indication indicating the presence of the visual portion;
      receive at the server a selection of the visual portion in response to the visual indication; and
      determine a visual device according to a client request, the visual device separate from the audio device and operable to display the visual portion.

17. The system according to claim 16, wherein the logic is further operable to display the visual portion on the visual device.

18. The system according to claim 17, wherein the logic is further operable to:
   receive a display change request from the one or more client devices; and
   determine a second visual device distinct from the audio and visual devices for displaying the visual portion in response to the display change request.

19. The system according to claim 18, wherein a user generates the display change request in response to the user changing location.

20. The system according to claim 18, wherein the display change request is generated by a client device in response to a change in location of the client device.

21. The system according to claim 18, wherein the second visual device comprises a video display.

22. The system according to claim 16, wherein the available data comprises an electronic mail message.

23. The system according to claim 22, wherein the visual portion comprises a graphical attachment associated with the electronic mail message.

24. The system according to claim 22, wherein the audio portion comprises text associated with the electronic mail message.

25. The system according to claim 16, wherein the audio device comprises a voice phone.

26. The system according to claim 16, wherein the visual device comprises a video display.

27. The system according to claim 16, wherein the visual indication comprises a spoken indication of data not presentable in an auditory format.

28. The system according to claim 16, wherein the logic is further operable to receive a spoken indication from a user to display the visual portion.

29. The system according to claim 28, wherein the spoken indication from the user further indicates the visual device.

30. The system of claim 16, wherein the logic is further operable to communicate asynchronously the audio portion and the video portion.

* * * * *